July 3, 1951          D. R. TRINKLE          2,559,097
REPRODUCING MACHINE

Filed March 22, 1950          8 Sheets—Sheet 1

INVENTOR.
DALLAS R. TRINKLE

BY H. K. Parsons & L. W. Wright
ATTORNEYS

July 3, 1951

D. R. TRINKLE 2,559,097

REPRODUCING MACHINE

Filed March 22, 1950

INVENTOR.
DALLAS R. TRINKLE

BY H. H. Parsons & C. W. Wright

ATTORNEYS

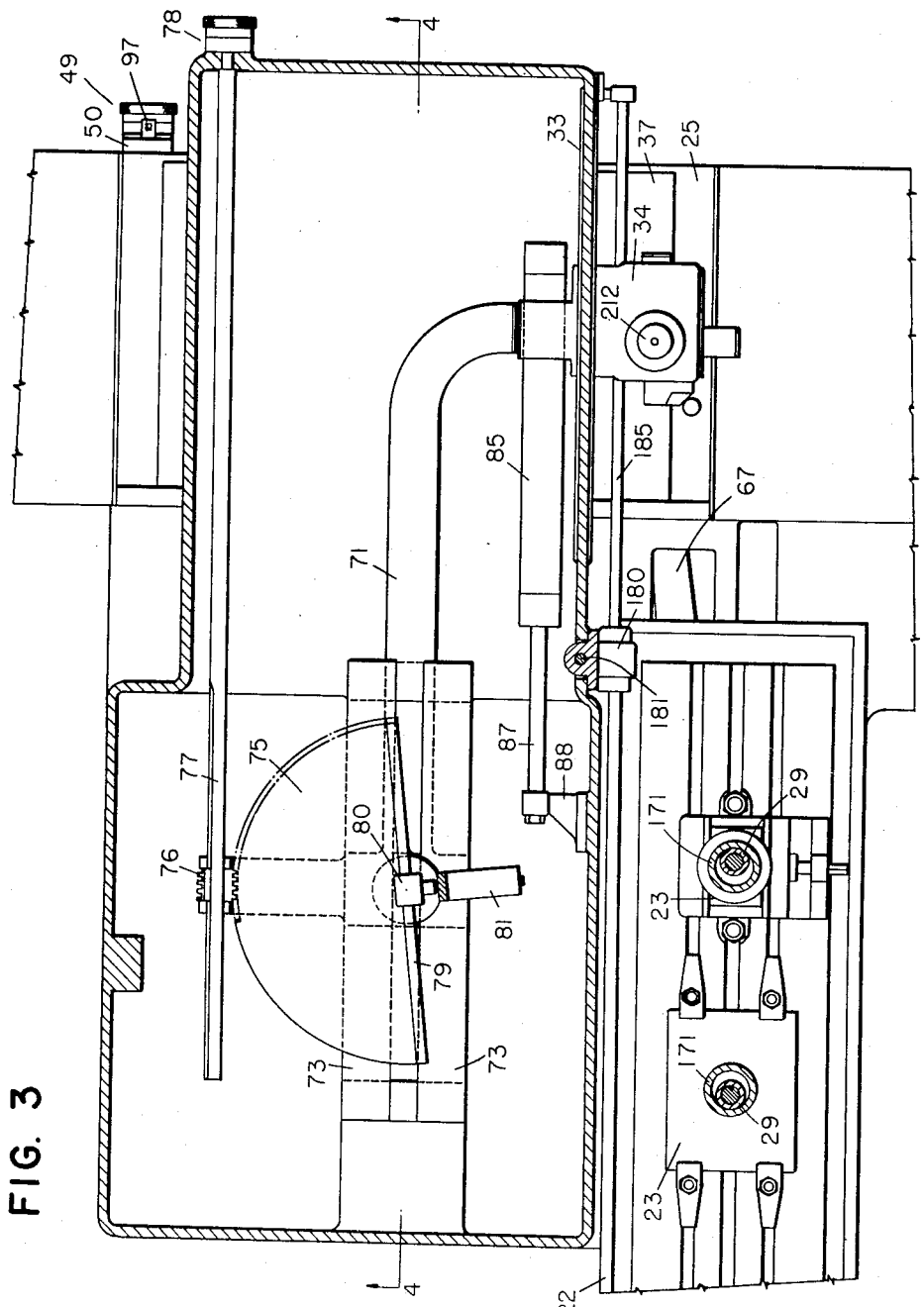

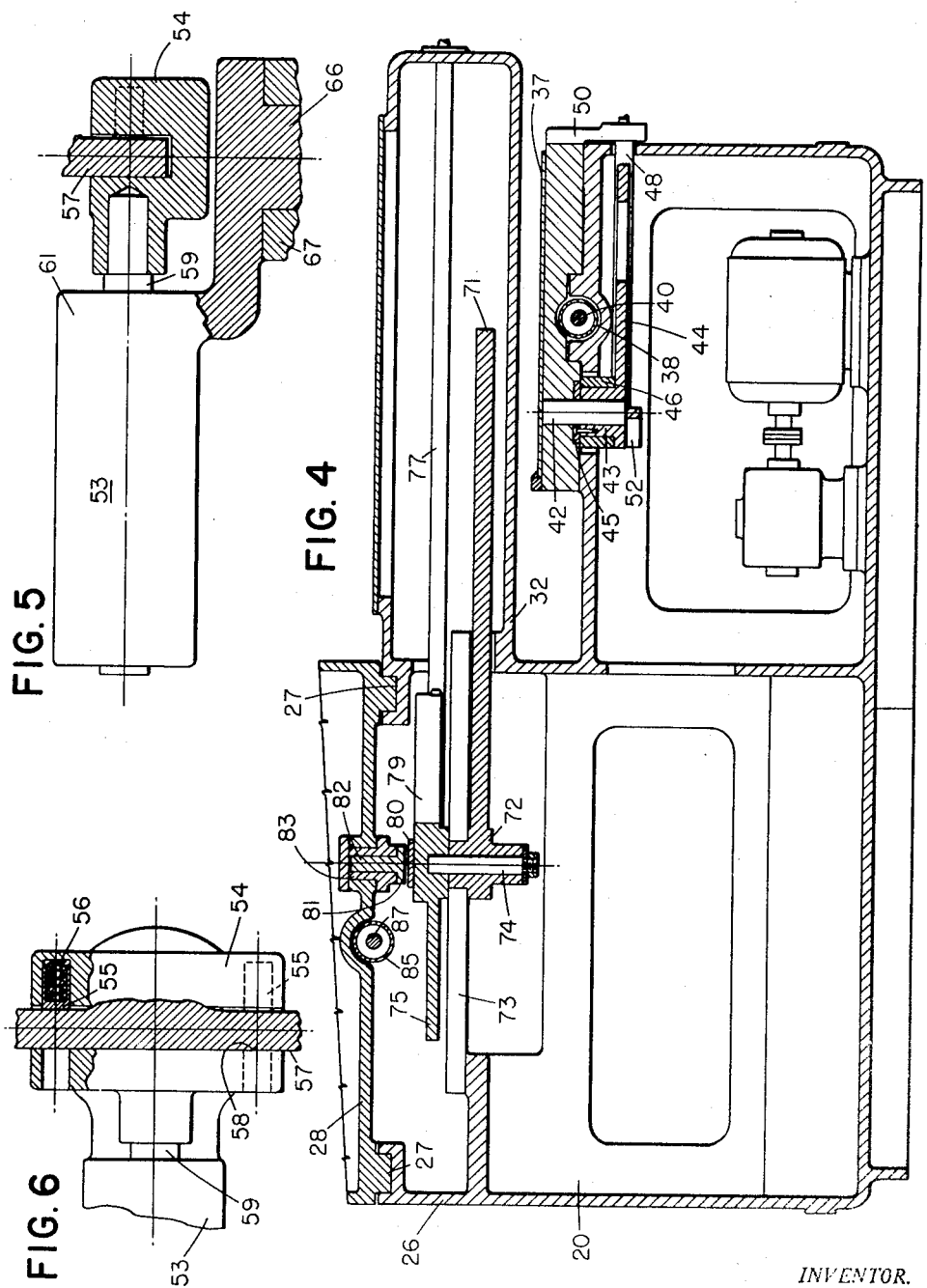

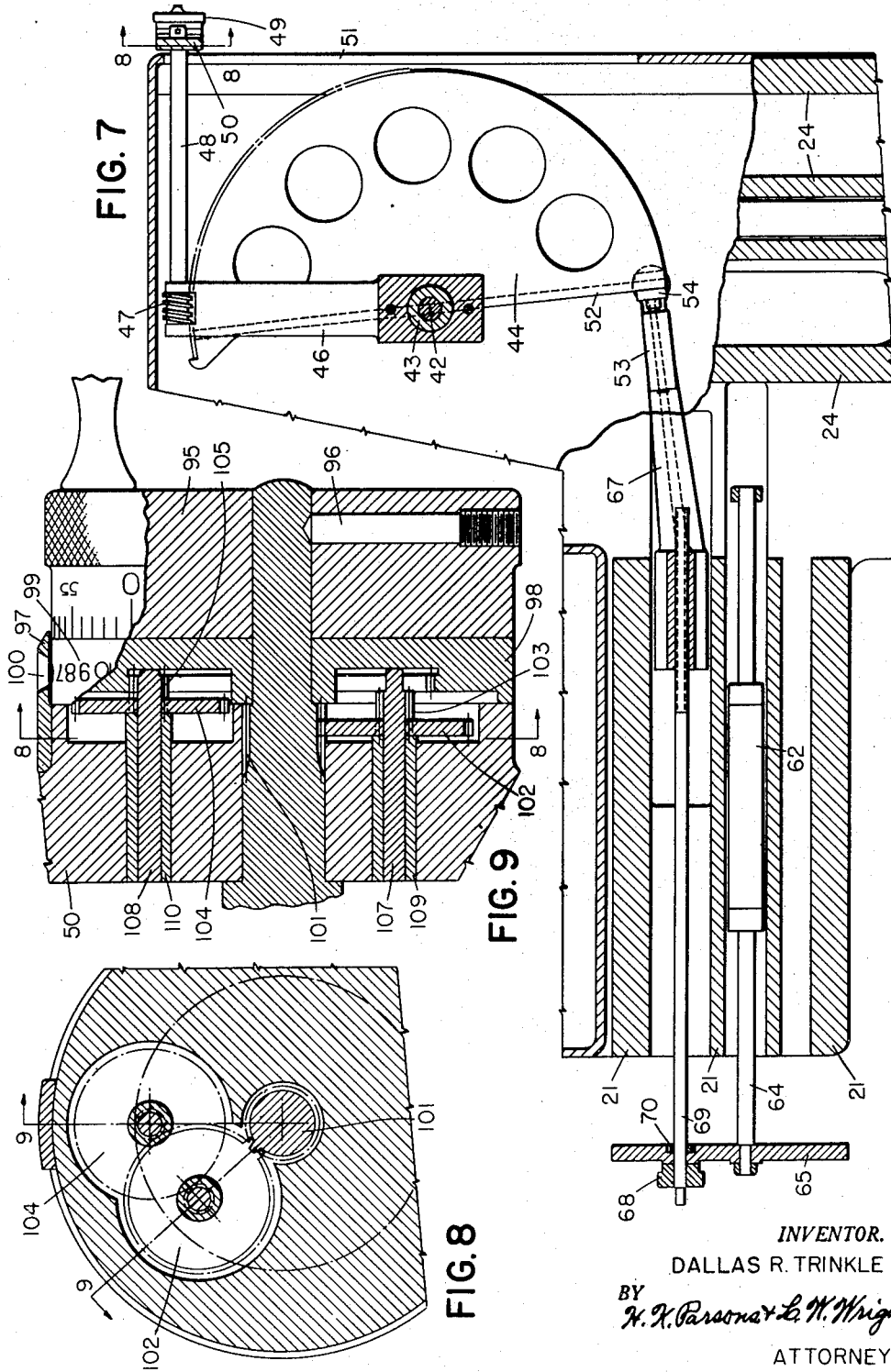

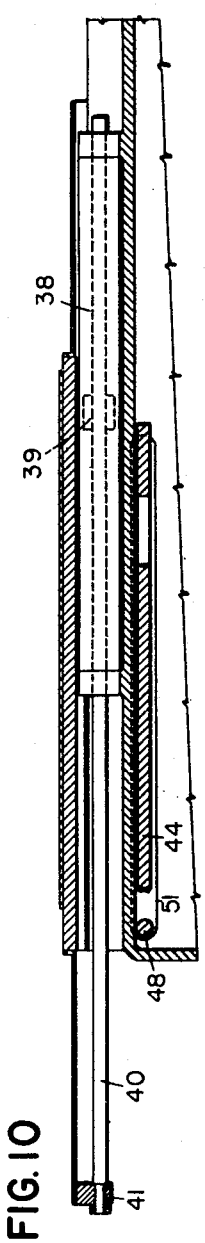

July 3, 1951

D. R. TRINKLE 2,559,097

REPRODUCING MACHINE

Filed March 22, 1950

*INVENTOR.*
DALLAS R. TRINKLE
BY
*H. K. Parsons & B. W. Wright.*
ATTORNEYS

Patented July 3, 1951

2,559,097

UNITED STATES PATENT OFFICE 2,559,097

REPRODUCING MACHINE

Dallas R. Trinkle, Cincinnati, Ohio, assignor to The Cincinnati Milling Machine Co., Cincinnati, Ohio, a corporation of Ohio Application March 22, 1950, Serial No. 151,194

16 Claims. (Cl. 90—13.5)

This invention relates to improvements in machines for production of work pieces in accordance with a layout or pattern and has particular reference to machines for performing profiling or contouring operations.

One of the objects of the present invention is the provision of a machine of this character which may be employed for direct reproduction of the pattern or layout or for proportional variation of one or both of its dimensions.

A further object of the invention is to provide a readily adjustable size determining mechanism for accurately controlling the relationship between the relative movements of the pattern and follower with respect to the directionally controlled relative movements between the work piece and forming tool.

Another object is to provide a reproducing machine embodying improved accurate control at selected proportional rates of the power effected relative movements of a cutter and work piece in prescribed proportional relationship to concurrently effected relative movements of a layout or pattern and a pattern following member.

A more specific object of the present invention is the provision of a machine embodying individually controllable ratio determining means for each direction of relative movement of a pattern and a follower establishing the basis design of the shape to be produced, which will modify the nature and extent of the relative movements of cutter and work as respects those of the pattern and follower.

A further object of the invention is the provision of an adjustable ratio determining mechanism which may be employed with either direct mechanical, hydraulic or other power amplifying mechanism for determination of the final size and shape of work piece produced.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 3 is a horizontal sectional view taken substantially on the line 3—3 of Figure 1.

Figure 4 is a vertical sectional view as on the line 4—4 of Figure 3.

Figure 5 is a fragmentary sectional view of the servo-valve mechanism in elevation.

Figure 6 is a fragmentary plan view of the servo-valve mechanism with parts broken away.

Figure 7 is a fragmentary horizontal sectional view taken on the line 7—7 of Figure 1.

Figure 8 is a vertical section as on the line 8—8 of Figure 7.

Figure 9 is an expanded sectional view taken on line 9—9 of Figure 8.

Figure 10 is a fragmentary vertical section on the line 10—10 of Figure 1.

Figure 11 is a fragmentary vertical sectional view on the line 11—11 of Figure 1.

Figure 1:
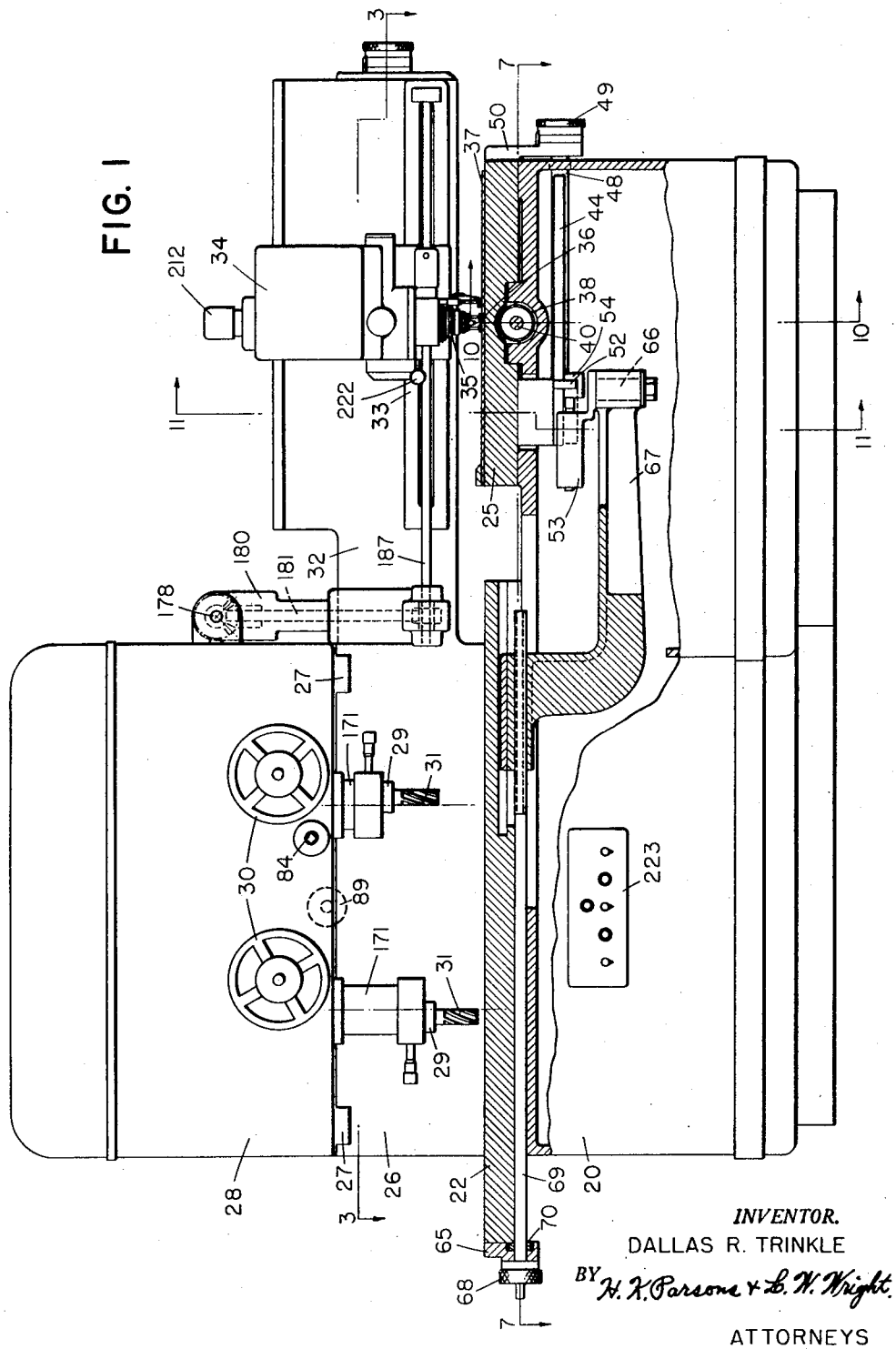
Figure 1 is a front elevation of one embodiment of the invention.

In the drawings the numeral 20 indicates the bed of the machine provided with longitudinal ways 21 on which is mounted for longitudinal movement the table 22 carrying the work piece or work pieces 23. As illustrated in Figure 1, the bed is also provided at its right hand portion with the additional ways 24 for the layout or pattern supporting table 25 movable transversely as respects the bed or in a path at right angles to the direction of the movement of the table 22.

Rising from the bed 20 is the column portion 26 having on its upper face the ways 27 for the transversely moving ram 28. The ram carries the cutter spindles 29 whose vertical position may be determined by the hand wheels 30 and which in use are provided with cutters as indicated at 31.

Laterally extending from the column portion 26 is a horizontal frame 32 having ways 33 on which is slidably mounted for longitudinal adjustment the tracer unit 34 from which depends the tracer head 35 carrying tracer points 36 adapted to follow the layout or pattern 37 supported by the table 25.

Figure 12:
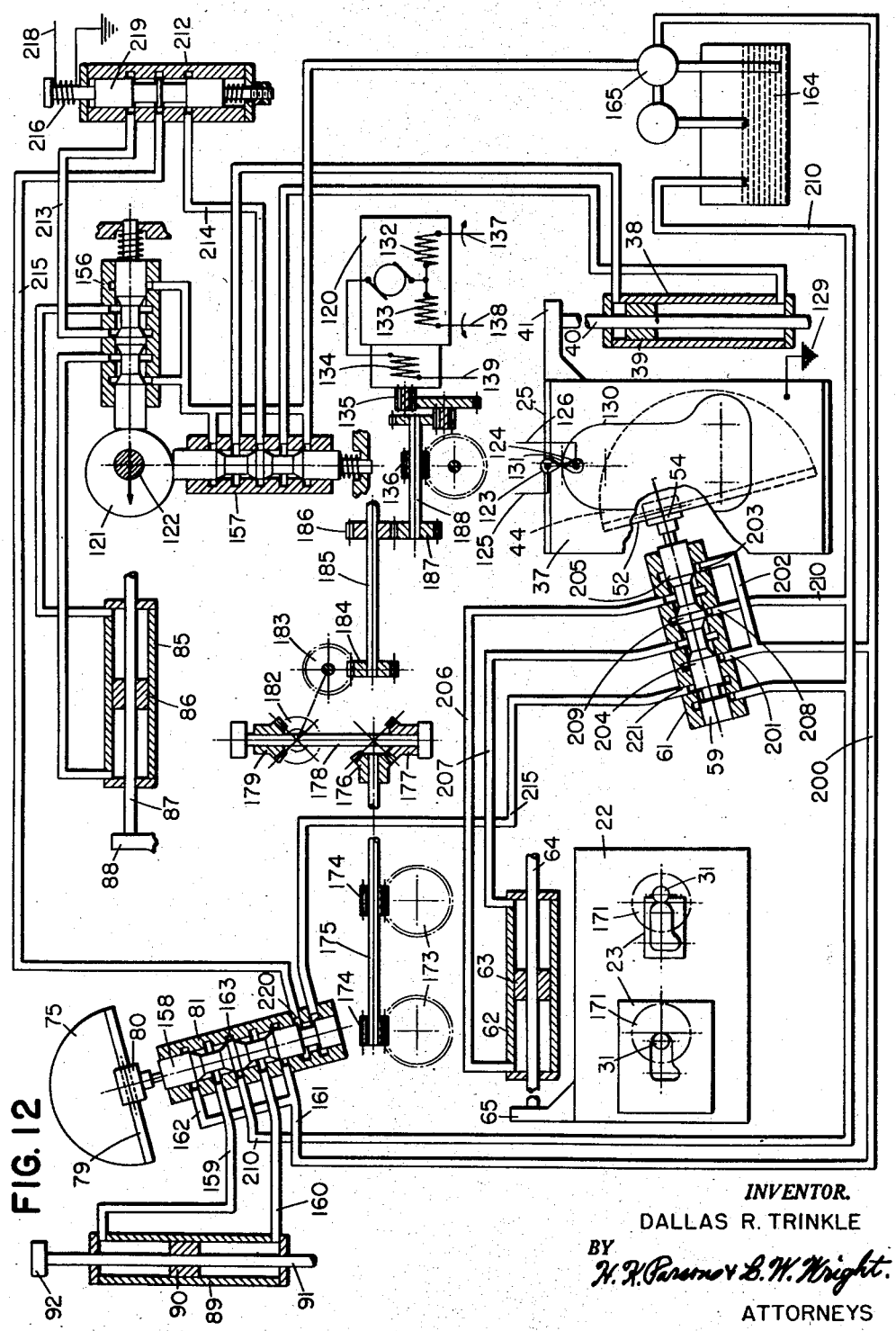
Figure 12 is a diagrammatical view of the hydraulic actuating circuits and related control parts of the machine.

As indicated in Figures 1, 10, and 12, a cylinder 38 is secured to the bed 20 and contains the reciprocating piston 39 coupled by piston rod 40 to bracket 41 to effect the forward and rearward movement of the table 25. Depending from said table is a cylindrical stud 42 on which is rotatably mounted the hub 43 of worm gear segment 44 as also shown in Figures 4 and 7. The flange portion 45 is mounted to the hub 43 by suitable screw connections to provide end support for hub 43 in the bracket 46. The worm gear segment 44 meshes with the worm 47 that is secured to shaft 48 provided with the adjusting dial 49. The shaft 48 is journaled in a bracket 50 that is secured to the table 25 as shown in Figures 1, 3, and 4, and moves in a transverse direction with the table. In the bed 20 is a horizontal slot 51 that provides clearance for shaft 48 as the table is moved transversely on its ways. A downwardly extending flange or sine bar 52 on the worm gear segment 44 is provided for cooperation with the servo-valve unit generally indicated by 53 and shown in detail in Figures 5 and 6. This unit has a shoe 54 and spring operated plungers 55 cooperating with springs 56 as indicated in Figures 5 and 6 to press the surface 57 of the downwardly extending flange 52 against the surface 58 of shoe 54 to provide a slidable fit between the members and prevent lost motion or any independent relative movement in a plane perpendicular to the direction of travel. Connected to the shoe 54 is the plunger 59 which is provided with a spool 60 that cooperates with the ports in the casing 61. The servo-valve unit 53 operates the hydraulic actuating cylinder 62 in a manner hereinafter disclosed in detail. The cylinder 62 has a piston 63 which operates the piston rod 64 connected to the work carrying table 22 by the bracket 65.

The casing of the servo-valve 53 is connected to the stud 66 which is pivoted to the arm 67 that moves longitudinally with the work table 22. For set-up purposes, the arm 67 is adjustably connected to the table 22 by a construction shown in detail in Figures 1, 2, and 7. This adjustment is determined by the rotation of the dial 68 on the lead screw 69 that is threaded into a section of the arm 67. The lead screw 69 is journaled for rotation in the work table bracket 65 and is held from independent axial movement by the collar 70 and the dial 68.

Transverse horizontal movement of the layout carrying table 25 will move the downwardly extending flange 52 in a transverse path and due to its angular position as determined by the dial 49, a predetermined relative movement of the work carrying table 22 will be effected in a longitudinal direction or at right angles to the direction of movement of the layout carrying table 25. Rotation of dial 49 will adjust the sine bar 52 to any angular position, ranging from one that is parallel to the direction of movement of table 25, to a position that is 90 degrees therefrom. If the angular position of the sine bar 52 is at 45 degrees to the direction of travel of the table 25 then the rate or amount of movement of the work carrying table 22 will be the same as that of the layout or template carrying table 25.

The tracer unit 34, as has been previously described, is mounted on the ways 33 for longitudinal movement in a plane substantially at right angles to that of the table 25. As shown in Figures 1, 3, 4, and 11, the arm 71 is connected with the tracer unit 34 for longitudinal movement therewith and has the shoe 72 in the opposite end thereof that moves between the bars 73 that are mounted on the vertical column 26. Rotatably connected to the shoe 72 is the stud 74 that is secured to the worm gear segment 75 which cooperates with the worm 76 on the splined shaft 77. The angular position of the shaft 77 may be adjusted by a dial 78 which is similar to the dial 49 previously described. The segment 75 has an upwardly extending flange or sine bar surface 79 that cooperates with the shoe 80 of a servo-valve unit which is identical in construction and function to that shown in Figures 5 and 6. The casing 81 of the servo-valve is connected to the cylindrical stud 82 which is mounted for rotation in the slidably adjustable shoe 83 that is carried by the ram 28. The feed screw 84, the dial and square external portion of which is shown in Figure 1, is threaded into the rectangular shoe 83 in a manner similar to that described for lead screw 69 and the arm 67. Rotation of screw 84 by a suitable crank will enable the ram and its associated cutters 31 to be moved independent of the tracer unit 34 for set-up purposes.

Figure 2:
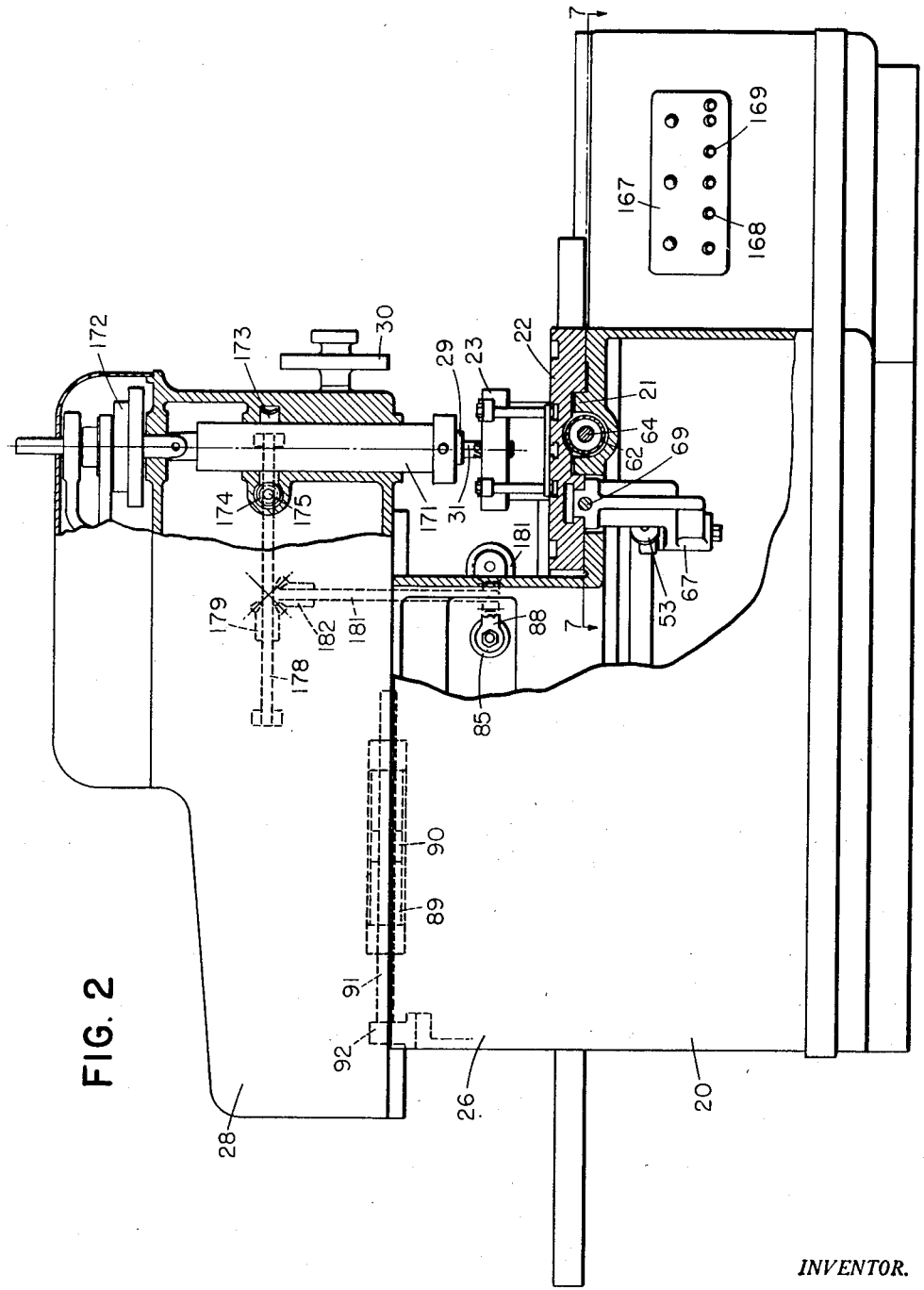
Figure 2 is an end elevation thereof with parts broken away.

Longitudinal movement of the tracer unit 34 is accomplished by the hydraulic cylinder 85 having a piston 86 connected to the piston rod 87 that is secured to the column 26 by bracket 88. The servo-valve casing 81 is connected by conduits, hereinafter described, to the hydraulic cylinder 89 that is provided for transverse actuation of the ram 28. The piston 90 is connected to the piston rod 91, and it is secured by the bracket 92 to the column 26 as shown in Figure 2.

Rotation of the splined shaft 77 turns the worm segment 75, thereby changing the angle of inclination of its sine bar 79 relative to that of the longitudinal movement of the tracer unit 34. When the sine bar 79 is parallel to the direction of movement of the tracer unit 34, no resultant movement of the ram 28 will be accomplished by movement of the tracer unit, but when the sine bar 79 is turned out of parallel alignment with the transverse travel of the tracer unit the hydraulic system, hereafter described, will produce relative movement of the ram 28.

As pointed out heretofore, if the adjustment of the sine bar is such that it will bear a 45 degree angular relationship with the movement of the tracer unit 34, then the movement of the ram will be equal to that of the tracer unit.

The micrometer dial means for effecting accurate minute adjustments of the sine bar segments 44 and 75 is illustrated in detail in Figures 8 and 9. The sine bar segments 75 and 44 are provided with one tooth on periphery per degree of rotation and the worm gears 47 and 76 are single thread so that one revolution of the shafts 48 or 77 will result in one degree of angular displacement of their sine bar segments. Therefore, the dial member 95 which is securely connected to the shaft, such as by dog point set screw 96, is calibrated to read in sixtieths of a degree or in minutes. The conventional vernier calibrated zero marker, such as 97, is provided for reading in divisions of a minute for rotational movement of the dial member 95. In order to indicate the number of revolutions of a dial member 95 that have been taken from a position wherein the sine bar segments 44 and 75 are in a path parallel to the transverse and longitudinal movement of their respective driving means, a graduated member 98 is provided which is numbered as at 99 to read in degrees. These numbers are visible through the window 100 to indicate the amount of adjustment in degrees which has been imparted to the sine bar segments. For practical purposes, the gear reduction is approximately 100 to 1 between the dial member 95 and the calibrated member 98 so that any position of the sine bar segments 44 and 75 from zero to 90 degrees relative to the movement of their respective actuating units will be indicated through the window 100.

This gear reduction is accomplished by a pinion 101 cut on the shafts 48 and 77, meshing with a spur gear 102 which is integral with the pinion 103. The pinion 103 meshes with a second spur gear 104 which has an integral pinion 105 that meshes with the internal gear 106 formed in the graduated member 98. The member 98 has its central portion bearing on a reduced cylindrical section of the shafts 48 and 77 and is axially supported between the bracket 50 and the dial member 95. The straight cylindrical sections 107 and 108 are extensions of the pinions 103 and 105 respectively and are journaled in the sleeves 109 and 110 that are pressed into the bracket 50. Figure 8 shows diagrammatically the gears in the actual meshed relationship but for the sake of illustration a section is shown in Figure 9 in expanded relation as indicated by the line 9—9 of Figure 8.

Figure 13:
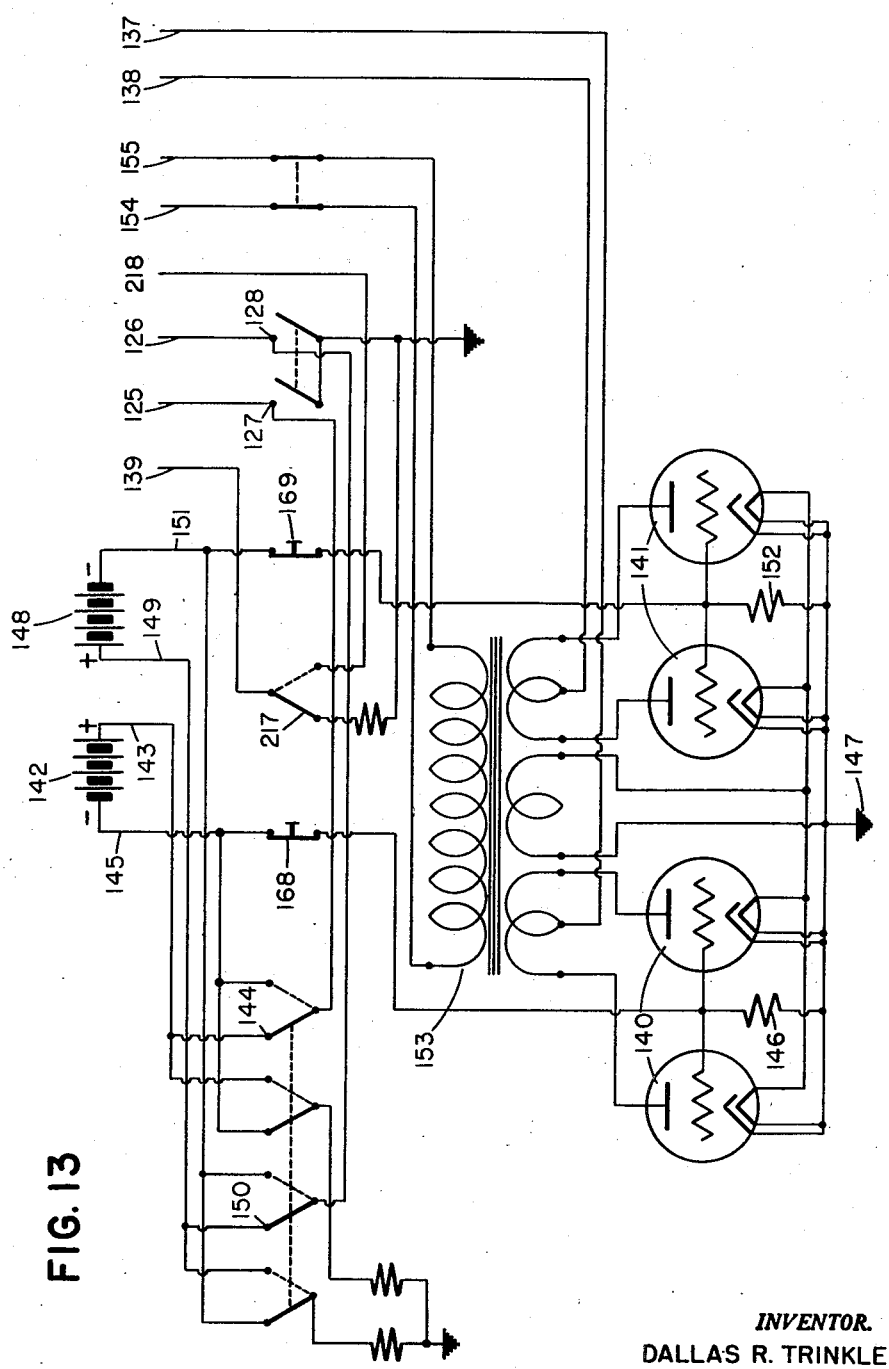
Figure 13 is a diagrammatical view of the electrical circuits for automatic pattern tracing control.

Figure 13 shows diagrammatically the electrical circuit for operation of the motor 120 which rotates the tracer control cam 121 and the related valves that will be hereinafter described. Connected to the shaft 122 and rotated therewith are two tracer fingers 123 and 124 that are electrically insulated from the frame of the machine and have their respective leads 125 and 126 connected to the switch terminals 127 and 128. In this instance, the layout 37 is a conducting material and grounded to the frame of the machine as at 129. The pattern line 130 is of insulating material and is applied by conventional drafting equipment to a sufficient thickness to provide a controlling path for the tracer fingers and the tracer control unit as they are brought into contact with the line. This is generally accomplished by causing the motor 120 to rotate the shaft 122 and its associate cam 121 in a clockwise direction whenever the tracer finger 123 contacts the line 130. As will be pointed out later, the change in angular position of the control cam 121 will produce a change in rate and feed of hydraulic fluid to the tracer head hydraulic cylinder 85 or the layout table hydraulic cylinder 38 to produce a change in the resultant movement between the tracer fingers and the profile layout.

Likewise, when the tracer finger 124 contacts the insulating profile layout 130, the opposite electrical circuit of the motor 120 will be enabled and the rotation of shaft 122, the control cam 121, and the mounting for the tracing fingers 123 and 124 will be rotated in a counterclockwise direction so as to move the tracer finger 124 out of engagement with the line 130 and into electrical contact with the layout material 37.

It should also be pointed out that the intersection of the center lines indicated by 131 in Figure 12 indicates the axis of rotation of the shaft 122 and the control cam 121. The tracer points are eccentrically advanced with respect to this axis of rotation in the direction of relative movement between tracer and layout. As a result, contact of one point or the other with the profile line will energize the motor 120 to swing the contacting tracer point out of engagement with the line and effect the required change in direction of relative movement between tracer axis and profile layout.

The motor 120 is of reversible, series wound, split-field, direct current type wherein the field 132 will energize the motor for rotation of shaft 122 in a clockwise direction and field 133 will produce the opposite result. A conventional type magnetic clutch is provided with the winding 134 for engaging the armature of the motor 120 with the drive pinion 135 which through connected gears produces rotation of the worm 136 and the worm gear that is connected to the shaft 122. Connected to the motor field 132 is a lead 137 and to the field 133 is lead 138.

The clutch coil 134 is connected through the lead 139 to ground. The motor field 132 is energized by a pair of grid controlled rectifying tubes 140 and, correspondingly, the motor field 133 is energized by a similar pair of tubes 141. When the tracer fingers are on opposite sides of the line and both in electrical contact with the pattern layout material 37, the motor is inactive because the tubes 140 and 141 are biased in nontransmitting condition.

The positive side of the battery 142 or suitable direct current supply is connected through lead 143 through the switch 144 to the terminal 127 and lead 125 to the tracer finger 123. The negative side is connected by lead 145 to the grid of the tubes 140. A high resistance bleeder 146 is provided between the grids and ground 147. Tracer finger 123, being in contact with the grounded layout material 37 completes a bias circuit so that the tubes 140 do not conduct. As soon as the transverse movement of the table 25 or the longitudinal movement of tracer head 34 causes the tracer finger 123 to engage the line 130, the positive battery circuit to the ground will be broken and the bias will be removed from the tubes 140 permitting them to fire. Resultant action will produce clockwise rotation of shaft 122 which will cause the tracer fingers to swing in clockwise rotation, bringing finger 123 out of contact with the insulating line 130 and into contact with the grounded layout material 37. This action will bias the tubes 140 to stop motor rotation, and if this angular adjustment of the control cam 121 produces sufficient change in the relative direction of movement between the tracer head and the layout so that it will move parallel to the profile line, the tracing action will continue without motor rotation until either tracer finger contacts the profile line.

When the tracer finger 124 contacts the line 130 the motor will turn the control cam and tracing fingers in a counterclockwise direction because the biasing circuit from the positive side of battery 148 through lead 149, switch 150, switch terminal 128 and lead 126 to the tracer finger 124 will be broken. The negative side of the battery is connected through lead 151 to the grid of the tubes 141 and a similar bleeder resistor 152 is provided to ground.

The primary of transformer 153 is energized by alternating current supplied through the leads 154 and 155. The secondary outside leads of the windings are coupled to the plates of the respective tubes 140 and 141 while the center taps are connected to motor leads 137 and 138.

The switch panel 167 shown in Figure 2 provides controls for the various electrical circuits utilized in profile tracing. The push button switches 168 and 169 may be employed to selectively operate the motor 120 and thereby control the direction of movement of the tracer head relative to the layout until the tracer fingers 123 and 124 are positioned on opposite sides of the line preparatory to automatic tracing.

The control effected by rotation of shaft 122 and cam 121 is that conventionally employed in known types of reproducing machines wherein the eccentric form of the cam 121 successively effects shifting movements of the valves 156 and 157 for acceleration of one of the motors 38 or 85 and corresponding deceleration of the other. A complete 360 degree revolution causes successive and opposite effects in this respect so that any type of contour may be reproduced, continuous rotation of cam causing relative movements of parts to produce a complete circular outline.

The manner in which the relative pattern controlled movements of tracer and layout determine the hydraulically effective corresponding relative movements of work and cutter is diagrammatically indicated in Figure 12. As has been previously described, the movements of the pattern tracer mechanism are at right angles to the corresponding relative movements of the work and cutter. In other words, the transverse or forward and back movement of the layout table determines the longitudinal translation of the work support 22 and the longitudinal movement of the tracer head controls the transverse movement of the cutter carrying ram.

To effect this result, the sine bar 52 is shown in Figure 12 as disposed at an angle of about 14 degrees to the rectilinear transverse path of the layout table 25. A rearward movement of the member 25 under tracer control as by actuation of the hydraulic cylinder and piston mechanism 38—39 will carry with it the sine bar element 52. As will be evident by reference to Figure 12, this rearward movement will react on shoe 54, moving the shoe to the right and carrying with it the valve plunger 59. The actuating pressure from the pump 165 is supplied through conduit 200 to port 201 and branch conduit 202 to port 203 of the servo-distributor valve mechanism 53.

In the position shown, the valve element 59 is in centralized or non-feeding position, and it will be noted that the valve shoulders 204 and 205 block off any incoming flow of the pressure fluid. The conduits 206 and 207 from cylinder 62 are coupled to servo-valve casing 61. Return of pressure fluid through exhaust port 208 is blocked by the valve spool 209.

When the layout table 25 moves rearward, the valve 59 will be moved to the right and the port 203 will be coupled to conduit 206 and the fluid will move piston 63 and work table 22 in a right hand direction. This will likewise move the arm 67 carrying the servo-valve casing 61 to the right, compensating for the amount of movement imparted to shoe 54 by the sliding action of the sine bar and thereby stopping any further movement of the table. It will thus be seen that any continuous or intermittent movement imparted to the layout table will effect a proportional movement of the work support with respect to the cutter.

As previously mentioned, if the sine bar 52 is set at a 45 degree angle, the movements will be equal in amount, whereas with substantially a 14 degree angular relationship as indicated in Figure 12, the amount of movement of the work support will be substantially one-fourth that of the pattern. Any desired ratio or proportion between the movements of the respective parts can be controlled by the angular setting of the member 52. The angular setting of the dial can be determined by reference to a natural trigonometric function table wherein the co-tangent of the sine bar angle is the scale of reduction or amplification, whichever the case may be. By this system, any conceivable scale of magnification or reduction from actual size up to infinity can be determined mathematically and quickly set on the sine bars by use of the dials.

Correspondingly, the longitudinal movement of the tracer 34 determines the nature and extent of transverse or back and forth movement imparted to the tool carrying ram 28. As has been pointed out, this transverse movement of the tracer is effected by the hydraulic motor 85—86 under control of the valve mechanism 156.

As the tracer head 34 is reciprocated, it carries with it the arm 71, the stud 74 and sine bar segment 75 which is connected to the sine bar 79. The shoe 80 associated with sine bar 79 is connected to the servo-valve plunger 158 which cooperates with the casing 81 for the control of the transverse movement of the ram. Conduits 159 and 160 connect opposite ports of the hydraulic cylinder 89 to the servo-valve casing 81. The pressure conduit 200 has a first inlet portion 161 communicating with the lower pressure port of the valve casing 81 and a branch conduit 162 communicating with the upper pressure port thereof. Conduit 210 provides connection from the exhaust port 163 to the reservoir 164.

When the sine bar 79 is moved to the right or left it will cause forward or rearward movement of the shoe 80 and its associated valve plunger 158 which alternately connect either pressure or exhaust ports to the respective cylinder conduits 159 or 160. Since the casing 81 moves transversely with the ram 28, any displacement of the plunger 158 will thereby be neutralized by a corresponding movement of the ram and casing 81.

It should be understood that the valve casing 81 is mounted to the ram by suitable swivel bracket corresponding in construction to that shown in Figure 5 in connection with the servo-valve 53 so that each may automatically swivel during angular adjustment of its respective sine bar to maintain a position at right angles or perpendicular thereto.

In some tracing conditions the interruption of relative movement between tracer and layout is desirable during rotation of the tracer fingers 123 and 124 and during the corresponding readjustment of the control cam 121 relative to the valves 156 and 157. To accomplish this, the magnetic safety valve 212 connects with the exhaust conduits 213 and 214 of the direction and rate valves 156 and 157 respectively. In the neutral position shown in Figure 12 the flow of exhaust fluid through the conduit 215 is unrestricted, but as soon as the motor 120 is energized the coil 216 may likewise be energized by shifting the switch blade 217 to the dotted position shown in Figure 13. This will connect the coil 216 in series with the motor and clutch windings through the lead 218. Whenever orientation of the tracer fingers 123 and 124 is desirable the motor will be energized and likewise the coil 216 will magnetically move the plunger 219 of the safety valve 212 downward to block the passage of fluid through the valve.

If the movement of the plungers 59 and 158 by their respective sine bars is not rapidly compensated for by corresponding movement of the valve casings 61 and 81, then a further blocking action of the rate and control valves 156 and 157 is desirable. This is accomplished by closing port 220 or 221 that are connected with conduit 215 so that the exhaust fluid from the hydraulic cylinders 38 and 85 will not have free passage to the reservoir through the conduit 210. As will be readily apparent, the over-positioning of plungers 59 or 158 in either direction will produce the desired blocking action and thereby withhold any further movement of the layout table 25 or the tracer head 34 until the work table 22 and the ram 28 have moved within the permissible operating range relative to their respective actuating sine bars.

On the switch panel 223 are mounted the switches for control of the hydraulic pump motor and the separate spindle motors. Pilot lights are also provided to indicate the operation of the respective motors.

The amount of eccentricity of the control cam 121 relative to the shaft 122 is accomplished by a mechanism conventionally used for tracers of this type. It includes a pair of splined axially misaligned sleeves that are externally positioned by the operation of adjusting segment 222. The cam may be moved radially from a position of maximum eccentricity wherein the highest rate of feed will be provided to one of concentricity with shaft 122 which completely centralizes the rate and control valves 156 and 157 to stop all relative movement between the tracer and layout.

The cutter spindle mounting here illustrated is substantially that shown in my copending application, Serial No. 120,206, which includes the outer rotary quills 170 vertically adjustable as by the hand wheels 30 having supported therein for eccentric adjustment with respect to the quill, the cutter holding spindles 29 rotated by suitable motor drive to the pulleys 172 as shown in Figures 1, 2 and 12. The quill is surrounded by a worm gear 173 driven by worm 174 on shaft 175 for effecting rotary adjustment of the quill. This shaft carries bevel gear 176 meshing with bevel gear 177 on the horizontal splined shaft 178 which is journaled in bearings on the ram 28. This shaft is driven by bevel gear 179 which has an axially slidable splined connection thereto. The bevel gear 179 is mounted for rotation in a housing 180 that is connected to the horizontal frame 32. The housing also provides suitable bearing for the vertical shaft 181, the upper end of which carries the bevel gear 182 that meshes with bevel gear 179. A spiral gear 183 is connected to the lower end of shaft 181 and meshes with the mating spiral gear 184 that is firmly connected to the splined shaft 185. The spur gear 186 is splined to the shaft 185 so as to have free axial movement thereon and is meshed with the spur gear 187 that is connected to the shaft 188 that carries the worm 136. The shaft 185 has its bearing at one end in the casing 180 and at the opposite end in a bracket likewise mounted to the horizontal frame 32. In each step of the gear transmission a one to one ratio is maintained so that the shaft 122 and the connected tracer fingers 123 and 124 move in perfect angular synchronism with the quills 171. It is also imperative that the plane of eccentricity adjustment of the cutter spindle 29 in the quills 171 is parallel to the direction of tracing indicated by the arrow on control cam 121.

It will thus be noted that the tracer unit 34 and the ram 28 may have independent longitudinal and transverse movement without effecting angular position of the tracer head or the toll spindle carrying quills. By this construction, the cutter may be positioned to follow a path axially coincidental with the center of the pattern line or may be eccentrically adjusted to follow with its periphery tangent to the inner outline of a die member as indicated at the left in Figure 12, or tangent to the outer surface of a punch member or part as indicated at the right. In this way, the punch and die may be simultaneously produced in exact accordance as to shape and size for proper interfitting or cooperative utilization.

From the foregoing it will be apparent that the present invention provides a completely automatic mechanism for power following of a contour line or other form of pattern to produce parts that are either identical in shape and size or complementary to each other.

It will be noted that in conjunction with this automatically controlled mechanism there has been provided means for producing relative movement between work support and tool support in two angularly related directions, said elements being structurally separated and distinct in their movements from the movements of the pattern and tracer supports.

The invention further provides interconnecting control elements between the respective supports so that movement of the pattern support or the tracer support will transmit to the power control means for the associated work and cutter supports related directional movements. The nature of such interconnection, however, is such that the extent, amount or ratio of movement of a controlled support with respect to a controlling support may be readily and independently varied or adjusted as desired so that the movements may be either actual size, magnified or reduced to produce desired variations in the size of the work piece produced with respect to size of the controlling pattern. Additionally, by accurate independent adjustment of the respective controls, the shape of the produced work piece may be made to correspond exactly with the shape of the pattern, or by a different ratio of movements of one of the controlling and controlled slides, variations in contour or shape of the finished work piece may be produced from a single pattern.

It will also be evident that the work piece or work pieces may be suitably mounted on their support and the pattern on its support in approximate desired relationship one to the other and the positioning of the respective controlling and controlled supports subsequently adjusted to bring the relationship of tool to work piece in exact desired relation to the position of the controlling tracer mechanism with respect to the pattern.

It will be further noted that the particular relationship shown in which a controlling slide has its movement in a direction at right angles to a controlled slide makes possible the utilization of a relatively simple translatable sine bar and valve shoe mechanism for direct transmission of the desired proportionate movement of related elements.

The self compensating valve connection between the controlling and controlled supports permits the use of a sensitive tracing mechanism for accurately following the pattern and the utilization of a powerful driving action for machining the work piece without the introduction of error or lost motion between the related supports. This combination is particularly advantageous when the dimensions of the work piece are greater than that of the controlling pattern.

The verner graduated dial for adjustment of the angular position of the sine bar permits the operator to set the scale of translation at any one of an infinite combination of scales for either amplification or reduction. As pointed out before, the angular value of the sine bar and the dial setting is readily determined from the cotangent of the desired scale.

What is claimed is:

1. A reproducing machine, including a bed, a pattern support and a tracer support, means mounting said supports on the bed for relative movement, power means for effecting relative movement of the supports, a tracer carried by the tracer support in position to cooperate with a pattern on the pattern support, connections between the tracer and said power means for automatic determination of relative movement of the supports, a work support and a tool support, means mounting said supports on the bed for relative movement in angularly related directions, power means independent of the first power means for effecting said relative movements and adjustable power controls intervening the pattern and tracer supports and said independent power means for determining the proportional actuation of the work and tool supports by said independent power means.

2. A reproducing machine, including a bed, a pattern support and a tracer support, means mounting said supports on the bed for relative movement, power means for effecting relative movement of the supports, a tracer carried by the tracer support in position to cooperate with a pattern on the pattern support, connections between the tracer and said power means for automatic determination of relative movement of the supports, a work support and a tool support, means mounting said supports on the bed for relative movement in angularly related directions, power means independent of the first power means for effecting said relative movements, and adjustable power controls intervening the pattern and tracer supports and said independent power means for determining the proportional actuation of the work and tool supports by said independent power means, said power controls including adjustable sine bar elements individual to said power controls.

3. A reproducing machine including a bed, a work support translatably mounted thereon, a pattern support mounted on the bed for movement in a direction at right angles to the direction of movement of the work support, means for effecting movement of the pattern support, independent power means for effecting movement of the work support, an adjustable sine bar control means carried by and movable with the pattern support, a power control means carried by and movable with the work support having a portion disposed in cooperative relation with said sine bar, and operative connections between said control means and the power actuating means for the work support whereby on movement of the pattern support sine bar actuation of the control means will determine the rate and extent of movement of the work support.

4. A reproducing machine including a bed, a work support translatably mounted theron, a pattern support mounted on the bed for movement in a direction at right angles to the direction of movement of the work support, means for effecting movement of the pattern support, independent power means for effecting movement of the work support, an adjustable sine bar control means carried by and movable with the pattern support, a power control means carried by and movable with the work support having a portion disposed in cooperative relation with said sine bar, operative connections between said control means and the power actuating means for the work support whereby on movement of the pattern support sine bar actuation of the control means will determine the rate and extent of movement of the work support, and means for varying the angular relationship between the sine bar and pattern support to vary the proportional rates of movement of the respective supports.

5. A reproducing machine including a bed, a work support translatably mounted thereon a pattern support mounted on the bed for movement in a direction at right angles to the direction of movement of the work support, means for effecting movement of the pattern support, independent power means for effecting movement of the work support, an adjustable sine bar control means carried by and movable with the pattern support, a power control means carried by and movable with the work support having a portion disposed in cooperative relation with said sine bar, operative connections between said control means and the power actuating means for the work support whereby on movement of the pattern support sine bar actuation of the control means will determine the rate and extent of movement of the work support, means for varying the angular relationship between the sine bar and pattern support to vary the proportional rates of movement of the respective supports, and means pivotally mounting the sine bar actuated control means whereby the same may remain substantially normal to the sine bar for different angularly adjusted positions of the sine bar.

6. A reproducing machine including a bed, a first pair of supports including a tracer support and a pattern support, means mounting said supports on the bed for relative movement in two angularly related directions, a second pair of supports including a tool support and a work support, means mounting said second pair of supports on the bed for relative movement in two angularly related directions, tracer controlled means for determining relative movements of the first pair of supports, independent power means for determining relative movements of each of the second pair of supports, an independent control device for each of said independent power means, each of said control devices including a servo follow-up mechanism, a first actuating mechanism coupling one of said first-mentioned pair of supports with the follow-up mechanism for one of the latter mentioned pair of supports, a second actuating mechanism coupling the other of said first-mentioned pair of supports with the follow-up control for the other of said second pair of relatively movable supports for actuation thereof, and means for adjusting the control mechanisms for the second pair of supports to vary the relative rates of movement of the first and second pairs of supports.

7. A reproducing machine including a bed, a first pair of supports including a tracer support and a pattern support, means mounting said supports on the bed for relative movement in two angularly related directions, a second pair of supports including a tool support and a work support, means mounting said second pair of supports on the bed for relative movement in two angularly related directions, tracer controlled means for determining relative movements of the first pair of supports, independent power means for determining relative movements of each of the second pair of supports, an independent control device for each of said independent power means, each of said control devices including a servo follow-up mechanism, a first actuating mechanism coupling one of said first-mentioned pair of supports with the follow-up mechanism for one of the latter mentioned pair of supports, a second actuating mechanism coupling the other of said first-mentioned pair of supports with the follow-up control for the other of said second pair of relatively movable supports for actuation thereof, a first means for varying the effective reaction of the control means on the follow-up device as respects a support of the first pair and the coupled support of the second pair and a second means for independently varying the reaction of the follow-up device intervening the other supports of the first and the second pairs whereby the relative rates of movement of the respective supports of the first pair and second pair may be independently varied.

8. A machine of the character described including a bed, a first support mounted on the bed for translation relative thereto, a second support mounted on the bed for translation relative to the bed in a direction at right angles to the direction of movement of the first support, means for moving the first support with respect to the bed, an angularly adjustable sine bar carried by said first support and movable therewith, an actuating means for said second support including an arm carried thereby and extending into proximity with the first support, and a guide carried by said arm and engaging the sine bar to determine the proportional movement of the second support with respect to the movement of the first support.

9. A machine of the character described including a bed, a first support mounted on the bed for translation relative thereto, a second support mounted on the bed for translation relative to the bed in a direction at right angles to the direction of movement of the first support, means for moving the first support with respect to the bed, an angularly adjustable sine bar carried by said first support and movable therewith, an actuating means for said second support including an arm carried thereby and extending into proximity with the first support, a guide carried by said arm and engaging the sine bar to determine the proportional movement of the second support with respect to the movement of the first support, power means for effecting movement of said second support, and a controller for said power means including a first shiftable element associated with and movable by the guide for initiating power movement of the second support, and a follow-up member carried by the arm and shiftable with the support for interrupting the action of the power means.

10. A reproducing machine of the character described including a bed, a control support and a controlled support movably mounted on the bed, a first means for determining movement of the control support, independent means for effecting movement of the controlled support, and means for determining the proportional movements of the supports, including a rotary sine bar support, means mounting said sine bar support for movement with and rotation with respect to the control support, a sine bar carried by the sine bar support, means for effecting micrometer angular adjustments of the sine bar, power means for effecting movement of the controlled support, and a rate and direction determinator for said power means including a follow-up member carried by and movable with the control support, and an actuator translatably supported thereby having a shoe portion riding on the sine bar whereby control support shifting of the sine bar will variably position said shoe, substantially as and for the purpose described.

11. A reproducing machine including a bed, a work support mounted for longitudinal translation with respect to the bed, a layout table supported by the bed for translation in a direction at right angles to the direction of the movement of the work support, a tool carrying ram mounted on the bed for translation in a direction at right angles to the direction of movement of the work support whereby any desired relative angular movements may be effected between tool support and work support, a tracer support mounted on the bed in overlying relation to the layout support, means mounting the tracer support for translation in an angularly related direction as respects the direction of translation of the layout support with respect to the bed, a guide member pivoted to the layout support and movable therewith, means for angularly adjusting the guide member with respect to the layout member, a control arm mounted on the work support and extending in the direction of the layout support, said control arm having a guide shoe interengaged with the angularly adjustable guide member for control of movement of the work support, and means for adjusting said arm with respect to the work support to vary the effective relationship between the pattern support and the work support.

12. A reproducing machine including a bed, a work support mounted for longitudinal translation with respect to the bed, a layout table supported by the bed for translation in a direction at right angles to the direction of the movement of the work support, a tool carrying ram mounted on the bed for translation in a direction at right angles to the direction of movement of the work support whereby any desired relative angular movements may be effected between tool support and work support, a tracer support mounted on the bed in overlying relation to the layout support, means mounting the tracer support for translation in an angularly related direction as respects the direction of translation of the layout support with respect to the bed, a guide member pivoted to the layout support and movable therewith, means for angularly adjusting the guide member with respect to the layout member, a control arm mounted on the work support and extending in the direction of the layout support, said control arm having a guide shoe interengaged with the angularly adjustable guide member for control of movement of the work support, means for adjusting said arm with respect to the work support to vary the effective relationship between the pattern support and the work support, guides on the bed subtending the ram, an arm carried by the tracer support having a portion cooperating with said guides, an angularly adjustable plate, means pivotally mounting said plate on the arm adjacent the guides, a guide bar carried by the plate and adjustable therewith, power operating means for the ram, and a ram rate controller carried by the ram, having a follower engaging the guide bar and actuable thereby to control the operation of said power operating means.

13. A reproducing machine including a control slide and a controlled slide, tracer controlled means for determining the direction and extent of movement of the control slide, an independent power actuator for the controlled slide, a rate and direction determinator for the movement of the controlled slide, and means carried by the control slide for operating said determinator.

14. A reproducing machine including a control slide and a controlled slide, tracer controlled means for determining the direction and extent of movement of the control slide, an independent power actuator for the controlled slide, a rate and direction determinator for the movement of the controlled slide, means carried by the control slide for operating said determinator, and means for varying the ratio of operation of the determinator effected by the control slide as respects the movement imparted to the control slide.

15. A reproducing machine including a first pair of control slides movable in angularly related paths, tracer controlled power means for determining the relative movements of the slides and thus the resultant path of movement thereof, a pair of controlled slides, independent power means for actuation of said slides, movement determinators individual to the power means for each of said controlled slides, a control device connecting one of the control slides with the determinator of one of the controlled slides, a control device connecting the other of the control slides with the determinator of the other of the controlled slides, and means for independently varying the reaction of said control devices as respects the individual determinators of power actuation means of the respective controlled slides.

16. A reproducing machine including a first pair of control slides movable in angularly related paths, tracer controlled power means for determining the relative movements of the slides and thus the resultant path of movement thereof, a pair of controlled slides, independent power means for actuation of said slides, movement determinators individual to the power means for each of said controlled slides, a control device connecting one of the control slides with the determinator of one of the controlled slides, a control device connecting the other of the control slides with the determinator of the other of the controlled slides, and means for independently varying the reaction of said control devices as respects the individual determinators of power actuation means of the respective controlled slides, each of said determinators including a feed back device carried by its controlled slide for limiting the movement of the controlled slide initiated through its respective control device by movement of its connected control slide.

DALLAS R. TRINKLE.

REFERENCES CITED

The following references are of record in the file of this patent:

UNITED STATES PATENTS

| Number | Name | Date |
| --- | --- | --- |
| 1,689,370 | Tessky | Oct. 20, 1928 |
| 2,053,597 | Bishop | Sept. 8, 1936 |
| 2,068,889 | Roehm | Jan. 26, 1937 |
| 2,303,956 | Rossbacher | Dec. 1, 1942 |
| 2,485,716 | Eberlein | Oct. 25, 1949 |